April 10, 1928.

L. A. LAURSEN 1,665,309

PROCESS OF VULCANIZING RUBBER

Filed Dec. 28, 1923

INVENTOR.

BY *L. A. Laursen*

*Robb Robb Hill*

ATTORNEYS.

Patented Apr. 10, 1928.

1,665,309

UNITED STATES PATENT OFFICE.

LAURITS A. LAURSEN, OF EAU CLAIRE, WISCONSIN, ASSIGNOR OF ONE-FOURTH TO PEARL FISHER LAURSEN, OF AKRON, OHIO.

PROCESS OF VULCANIZING RUBBER.

Application filed December 28, 1923. Serial No. 683,096.

The present invention relates to a process for vulcanizing rubber tubes and like articles, and is a continuation in part of my pending application which was filed March 14, 1923, Serial No. 624,977.

At the present time the method most generally used for the manufacture of rubber tubes consists in rolling a sheet of rubber compound upon a cylindrical pole or mandrel and then tightly wrapping the rubber compound with a fabric strip which is wound spirally thereon under tension so as to expel all of the bubbles of air and force the rubber compound into a close and intimate contact with the pole or mandrel. The mandrel with the wrapped rubber stock thereon is then placed in an open steam vulcanizer and exposed to steam at a temperature of about 290° F. until the rubber has been completely vulcanized. The fabric wrapping is then removed and the vulcanized rubber tube stripped from the pole or mandrel. In the act of stripping the rubber tube is turned inside out so that the face thereof which was in contact with the fabric strip and has an impression of the fabric strip molded therein will be on the inside of the tube and concealed from view. This face of the tube not only has a rough surface where it was in contact with the fabric wrapping, but is corrugated spirally due to the spiral winding of the fabric on the uncured rubber. Tubes which are formed in this manner have been found to be non-uniform in thickness and the tensile strength of the tubes varies at different points thereof. The rag markings upon the tubes not only provide an unsightly surface that must be concealed from the customer by turning the tubes inside out as they are stripped from the metal poles, but result in weakening the tube in different zones or areas so that the tube is not uniform in thickness and strength. Furthermore, the fabric strips or rags which are used in wrapping the tubes are exposed to the water and steam at alternately high and low temperatures, with the result that they rapidly deteriorate and break and the cost of these wrappings adds very considerably to the expense of manufacturing the tubes.

The object of the present invention has been to provide for the manufacture of such articles as rubber tubes without the necessity of using any rags or wrappings of any kind, thereby eliminating the expense of providing and applying the rags, and also enabling a tube to be produced which is free from the rag markings and is far more uniform in thickness and tensile strength than the tubes which were produced by the old method. According to my method, the rubber articles or tubes are subjected to a high fluid or hydraulic pressure before being cured and without the use of fabric or other form of wrapping. The rubber is preferably heated a sufficient amount to soften the same before the hydraulic or fluid pressure is applied so that the pressure can act in a most effective manner to force the rubber into an intimate contact with the pole or mandrel, and either compress or expel the minute air bubbles which may have been trapped in the rubber so that they will not leave hollow spots or pockets on the surface of the tube or weaken the finished tube.

One form of apparatus which may be used in carrying out the process is illustrated on the accompanying drawings, in which, Figure 1 is a side elevation of a tube or mandrel with the rubber stock applied thereto preparatory to being vulcanized, portions being broken away and shown in section.

Corresponding and like parts are referred to in the following description and indicated on all of the views of the drawings by like reference characters.

Figure 1:
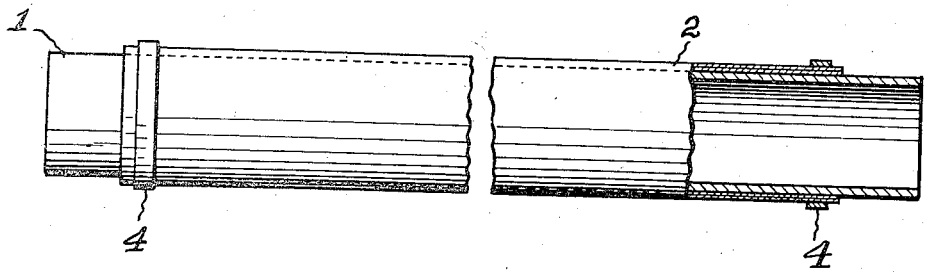
Figure 2:
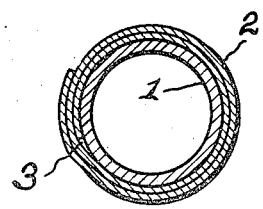
Figure 2 is a transverse sectional view through the mandrel and rubber stock, showing the manner in which the rubber stock is initially rolled upon the mandrel.

While the process may be used for producing other rubber articles it will, for the purpose of illustration, be disclosed in this application as used for the manufacture of rubber tubes. In manufacturing rubber tubes a sheet of rubber compound or unvulcanized rubber is ordinarily rolled upon a cylindrical tube or mandrel 1. The rubber compound is indicated by the numeral 2 on the drawing and by reference to Fig. 2 it will be seen that unless the rubber compound is tightly squeezed or compressed against the mandrel a small air pocket 3 will remain at the inner edge of the sheet of rubber compound, with the result that there will be an objectionable seam on the finished tube at this point. According to the old method of making tubes the rubber stock is tightly squeezed or compressed against the mandrel by wrapping it with a fabric strip which is wound spirally thereon while under a considerable tension, thereby expelling the air from between the rubber compound and the mandrel and also from between the layers of rubber compound. One of the objects of the present invention is to avoid the use of this fabric wrapping, since the fabric is not only an expensive item in the manufacture of tires, but leaves marks upon the rubber which are unsightly and tend to weaken the tube.

After the sheet of rubber compound 2 has been wound upon the mandrel 1, bands 4 of cured rubber or the like are applied to the ends of the tube. These bands preferably have a smaller diameter than that of the pole or mandrel and may be of any desired width from 1/8th inch to 1 inch, or even more or less. These rubber bands 4 close off the ends of the tube and clamp them tightly to the pole or mandrel. The outer lap of the sheet of rubber compound is then stitched or rolled down to hold it tightly in place and prevent moisture from entering between the plys. The tube is now ready to be placed in a boiler or heater, and for this purpose a number of the tubes may be mounted upon a truck so that they can be moved collectively into and out of the heater and all treated at the same time.

Figure 3:
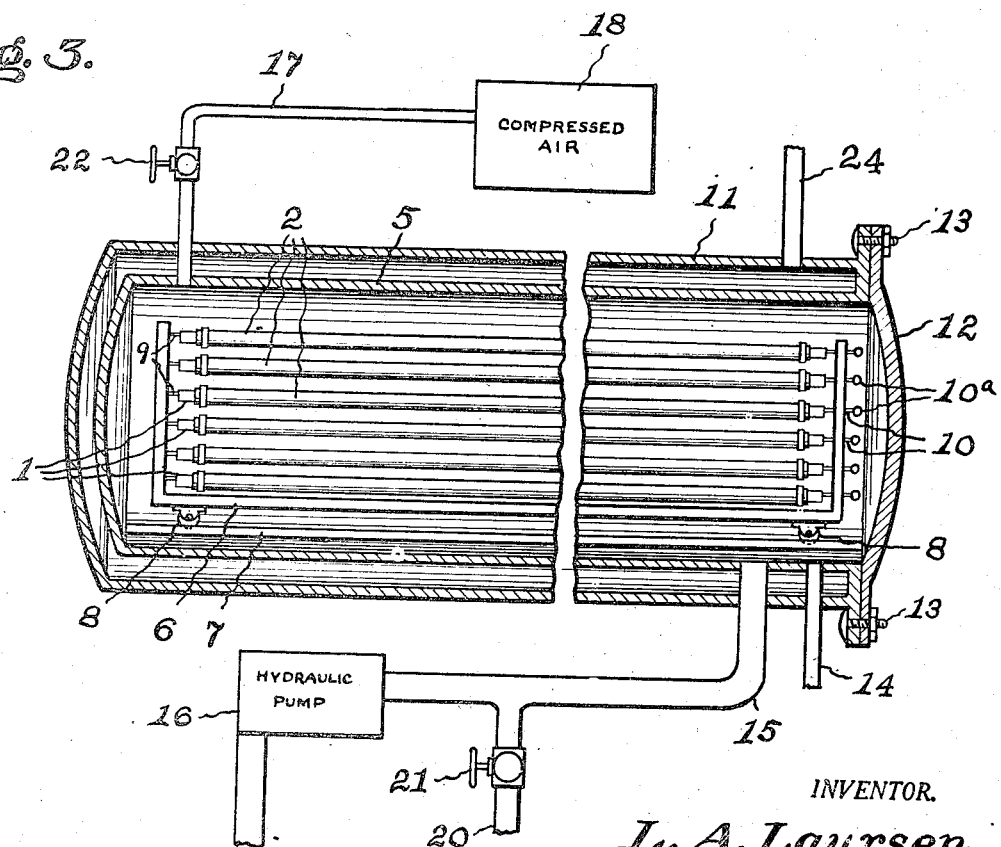
Figure 3 is a longitudinal sectional view through a steam boiler which is of a type adapted to be used in carrying on the process.

A suitable form of boiler 5 is shown by Fig. 3, and the truck 6 is movable into and out of the boiler, the bottom of the boiler being shown as provided with tracks 7 which receive the rollers 8 of the truck. The tubes may be supported upon the truck in any suitable manner, and for the purpose of illustration the ends of the tubes are shown as engaged by the respective pins 9 and 10. The pins 10 are slidable so that they can be moved into and out of engagement with the mandrels and are provided at their ends with finger pieces 10ª to facilitate grasping and manipulating the same. It will be understood, however, that the manner of supporting the mandrels upon the truck is immaterial and has no particular relation to the present invention.

The heater or boiler is surrounded by a jacket 11 and is provided with a removable cover 12 which is adapted to be held securely in a closed position by suitable fastening means, such as the bolts 13.

After the tubes have been placed in the heater they are subjected for a short period of time to a sufficient amount of heat to soften the rubber stock on the mandrel or pole. This heat is at a low pressure and is not sufficiently high to start the curing process. This initial heating may be readily accomplished by introducing low pressure steam to the boiler in some suitable manner as through the steam pipe 14. It has been found that satisfactory results can be obtained if this steam is at a temperature of 70 about 200° F. and is permitted to act upon the tubes for about two minutes. This will not start the curing or vulcanizing process, but will soften the rubber stock and permit the rubber bands 4 to sink in and close off the small opening 3 at the ends of the tube.

After the tubes have thus been initially heated a sufficient amount to soften the rubber they are subjected to a considerable amount of hydraulic or fluid pressure. This can be accomplished by submerging the tubes in some inert fluid or liquid, such as water, and subjecting the fluid or liquid to the required pressure. In the form of apparatus which has been shown on the drawing, water can be forced into the boiler through a water pipe 15. A suitable hydraulic pump 16 may be used for forcing the water into the boiler, and the top of the boiler may communicate through a pipe 17 with an air reservoir 18. The water may be forced into the boiler by the pump until the tubes are entirely submerged and steam may then be applied to the water so as to heat the same to any desired temperature, or to a temperature of 287 or 300° F. This water is maintained under a high pressure and in actual practice it has been found that good results are obtained where this pressure is from 140 lbs. to 150 lbs. per square inch. The air reservoir provides a cushion and the hydraulic pump can be operated to produce and maintain the pressure. The exact manner of producing and maintaining the pressure is immaterial, and the pressure might be produced by using an air compressor to compress the air in the top of the boiler. This high pressure, which would ordinarily be from 140 to 150 lbs. per square inch is maintained for a short period of time. It has been found that under ordinary conditions a period of two or three minutes is sufficient and this pressure serves to force the softened rubber into a very intimate contact with the pole or mandrel and to either expel the air from the softened rubber, or to compress the air so that there will be no air holes or blemishes in the finished tube.

While satisfactory results can be obtained by submerging the tubes in water and subjecting them to hydraulic pressure, as just described, it will be understood that any other inert fluid medium may be used and that the water or other inert fluid is simply a medium for applying the high pressure to the rubber tubes while they are in a softened condition. The tubes should not be heated sufficiently so that they will start to cure before the pressure is applied, as under these conditions a small film will be cured on the outside of the tube and it is difficult or impossible to smooth out this film by applying the pressure.

After the softened rubber tubes have been subjected to this high pressure of from 140 lbs. to 150 lbs. per square inch for a sufficient period of time to force the rubber into a very intimate contact with the metal pole or mandrel and expel or compress the air, the pressure may be released and the tubes vulcanized or cured in the usual manner. Where water is used for obtaining the pressure the water may be slowly drained off and allowed to escape, although it will be understood that this water which is heated to about 287° F. will generate steam in the boiler and leave the boiler filled with steam which is at a temperature of about 287°. This steam is at the proper temperature for curing or vulcanizing the rubber in the usual manner. On Figure 3 of the drawing the water pipe 15 is shown as provided with a drain pipe 20, through which the water can be withdrawn from the boiler at the proper time. This drain pipe is controlled by a suitable valve 21. The air pipe 17 is shown as provided with a valve 22 which can be used for opening and closing the same. Steam can be introduced into the jacket 11 of the boiler through a pipe 24 for maintaining a proper vulcanizing temperature within the boiler if it is desired to heat the boiler in this manner.

Under some conditions it may be found desirable to transfer the tubes to another boiler for the final curing or vulcanizing process. The ordinary boilers which are used for the curing of tubes are not constructed to withstand a pressure much greater than 60 lbs. per square inch, and the manufacturer may happen to have one or more of these boilers on hand. These boilers would not withstand the pressure of 140 lbs. or 150 lbs. per square inch which is utilized in carrying on the present process to force the uncured rubber into intimate contact with the poles or mandrels, and it would be necessary to have a stronger and more expensive boiler for carrying on this step in the process. However, after the tubes had been subjected to the high pressure in the stronger boiler, they might be removed from this strong boiler and transferred to one of the old style weaker boilers for the final step which is the usual curing of the rubber at a temperature of from 287° to 300° F.

In carrying out the process a small amount of soap stone can be placed in the heater or boiler before the water is admitted thereto. This soapstone will become thoroughly mixed with the water and if steam is admitted to the water the latter will be circulated in the boiler so as to leave a very even coating of the soapstone all over the tubes. This causes the tubes to keep their form and prevents them from sticking together when placed in the boxes for shipment. It also causes the tubes to have a nice fluffy appearance when they are removed from the boxes for inspection by a customer, and it is found that the use of soapstone in this manner renders it easier to strip the tubes from the poles.

In carrying on the process it is not absolutely necessary to initially soften the rubber before subjecting the tubes to the high fluid or hydraulic pressure, although where the tubes are first softened in the manner which has been just described a lower pressure will accomplish the same result in a quicker and more effective manner. It has been found that when the rubber has been forced tightly against the pole or mandrel and held in an intimate contact therewith for a short interval of time, that this rubber will remain in this condition during the curing process and produce a tube which is perfectly smooth and free from blemishes.

It is preferred to relieve the high pressure after it has been maintained for two or three minutes or sufficiently long to force the uncured rubber into a very close and intimate contact with the core and expel or compress any air bubbles therein, although this high pressure may be maintained during the full period of vulcanization if such is found desirable. While the continuance of the high pressure during the full period of vulcanization would do no harm, it has been found that it is not necessary and serves no useful purpose. The high pressure should be applied before the rubber article is heated to the proper temperature for vulcanization, so that the uncured rubber will be pressed into a close and intimate contact with the mandrel before vulcanization starts. This process of vulcanizing rubber produces perfect and unblemished tubes and like rubber articles, and avoids all of the expense of wrapping the rubber articles with rags or using other mechanical means for forcing the rubber closely against the core. According to this process the rubber tubes or articles are treated while devoid of covering of any kind, and the tubes which are produced are free from the objectionable rag markings and have a uniformity of thickness and tensile strength which it is difficult to attain with the old methods formerly in use.

Having thus described my invention what I claim as new and desire to secure by Letters Patent, is

1. The process of vulcanizing rubber articles which consists in mixing soap-stone and water to provide a liquid submerging bath, submerging the rubber articles therein, subjecting the liquid to pressure to cause said pressure to be transmitted to the surfaces of the rubber articles, and then vulcanizing said rubber articles.

2. The process of vulcanizing rubber articles which consists in placing an uncured rubber article on a core, softening the uncured rubber by heat less than required to cure it, submerging it in a liquid at a temperature too low for vulcanization, subjecting the liquid to sufficient pressure to force the rubber into an intimate contact with the core and expel or compress any unconfined air to prevent the formation of blemishes, and then vulcanizing the article at the proper temperature.

3. The process of vulcanizing rubber articles which consists in placing a rubber article on a core, softening the uncured rubber by heat less than required to cure it, submerging it in an inert liquid at a temperature too low for vulcanization, subjecting the liquid to sufficient pressure to force the rubber into an intimate contact with the core and expel or compress any unconfined air to prevent the formation of blemishes, and then vulcanizing the article by heating the liquid to the proper temperature.

4. The process of vulcanizing rubber articles which consists in mixing soap-stone and water to provide a liquid submerging bath, submerging the rubber articles therein, subjecting the liquid to pressure to cause said pressure to be transmitted to the surfaces of the rubber articles, and then vulcanizing said rubber articles by raising the temperature of the water to that required for vulcanizing the rubber articles.

5. The process of vulcanizing rubber articles which consists in placing an uncured rubber article on a core, softening the rubber by a heat too low for vulcanization, submerging the softened rubber article in a liquid at a temperature too low for vulcanization, subjecting the liquid to sufficient pressure to force the softened rubber into an intimate contact with the core and expel or compress any confined air to prevent the formation of blemishes, releasing the pressure after a definite period, and subsequently vulcanizing the article at the proper temperature.

6. The process of vulcanizing rubber articles which consists in placing an uncured rubber article on a core, softening the rubber by a heat too low for vulcanization, submerging the softened rubber article in an inert liquid at a temperature too low for vulcanization, subjecting the liquid to a sufficient pressure to force the softened rubber into an intimate contact with the core and expel or compress any confined air to prevent the formation of blemishes, releasing the pressure after a definite period and drawing off the liquid, and subsequently vulcanizing the article at the proper temperature in steam.

7. The process of vulcanizing rubber articles which consists in placing an uncured rubber article on a core, softening the rubber by a heat too low for vulcanization, submerging the softened rubber article in an inert liquid at a temperature too low for vulcanization, subjecting the liquid to a sufficient pressure to force the softened rubber into an intimate contact with the core and expel or compress any confined air to prevent the formation of blemishes, releasing the pressure and drawing off the liquid, and subsequently vulcanizing the article at the proper temperature.

8. The process of vulcanizing rubber tubes which consists in rolling an uncured rubber sheet on a mandrel, applying rubber bands to the ends of the rolled sheet, softening the rolled sheet by subjecting it to a heat too low for vulcanization, submerging the softened rubber sheet in an inert liquid at a temperature too low for vulcanization, subjecting the liquid to a sufficient pressure to force the softened rubber into an intimate contact with the mandrel, releasing the pressure and removing the mandrel and rubber sheet from the liquid and subsequently vulcanizing the tube at the proper temperature.

9. The process of vulcanizing rubber articles which consists in placing an uncured rubber article on a core, submerging it in water mixing soapstone with the fluid, subjecting the water to sufficient pressure to force the rubber article into an intimate contact with the core, and then vulcanizing the article at the proper temperature.

10. The process of vulcanizing rubber articles which consists in placing an uncured rubber article on a core, softening the rubber by subjecting it to a heat too low for vulcanization, submerging the softened rubber in an inert liquid, mixing soapstone with the inert liquid whereby it is distributed over the rubber article, subjecting the liquid to a pressure to force the rubber article into an intimate contact with the core, removing the article from the liquid and vulcanizing the article at the proper temperature.

11. The process of manufacturing rubber tubes, which consists in placing the uncured rubber tubes on cores, sealing the open ends of the tubes to the cores, submerging the tubes while upon the cores and without external confining means in water or a similar liquid, subjecting the water to a pressure great enough to force the rubber into intimate contact with the cores and thereby molding the tubes to the desired shape, heating the water to a vulcanizing temperature to carry on the vulcanization of the tubes, relieving the pressure of the water upon the tubes after a definite period, finishing the vulcanization of the tubes under a pressure less than the water molding pressure, and after vulcanization stripping the tubes from the cores.

12. The process of manufacturing rubber tubes, which consists in placing the uncured rubber tubes on cores, sealing the open ends of the tubes to the cores, submerging the tubes while upon the cores and without external confining means in water or a similar liquid, subjecting the water to a pressure great enough to force the rubber into intimate contact with the cores and thereby molding the tubes to the desired shape, heating the water to a vulcanizing temperature to carry on the vulcanization of the tubes, releasing the pressure and drawing off the water before the tubes are completely vulcanized, finishing the vulcanization of the tubes in a curing medium other than water under a pressure less than the water molding pressure, and after vulcanization stripping the tubes from the cores.

13. The process of manufacturing rubber tubes, which consists in placing the uncured rubber tubes on cores, sealing the open ends of the tubes to the cores, submerging the tubes while upon the cores and without external confining means in water or a similar liquid, subjecting the water to a pressure great enough to force the rubber into intimate contact with the cores and thereby molding the tubes to the desired shape, heating the water to a vulcanizing temperature to carry on the vulcanization of the tubes, releasing the pressure and drawing off the water before the tubes are completely vulcanized, finishing the vulcanization of the tubes in steam under a pressure less than the water molding pressure, and after vulcanization stripping the tubes from the cores.

14. The method of vulcanizing rubber articles, which consists in preliminarily softening the articles by low pressure steam, and thereafter subjecting the softened articles to contact with water or an equivalent liquid heated to the desired vulcanizing temperature.

In testimony whereof I affix my signature.

LAURITS A. LAURSEN.